Jan. 21, 1969    M. MINTZ    3,423,648
ELECTROLYTIC CELL WITH ELECTRICALLY CONDUCTIVE MASKING SURFACE
Filed Jan. 10, 1966
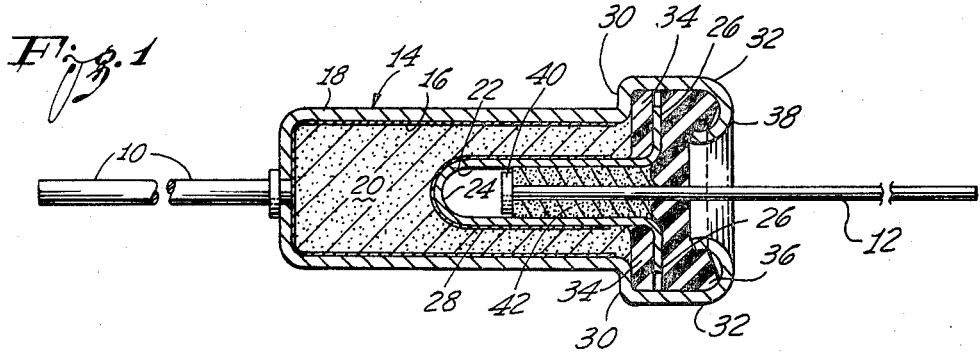
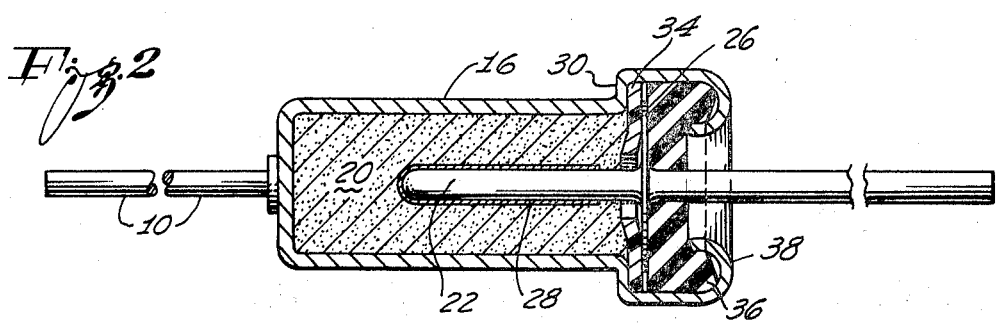
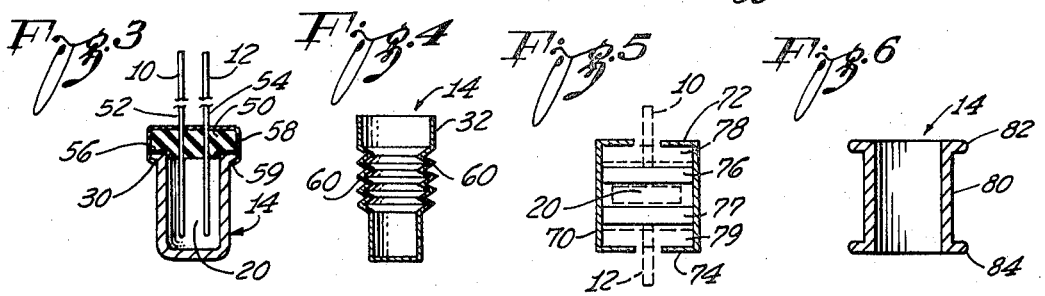
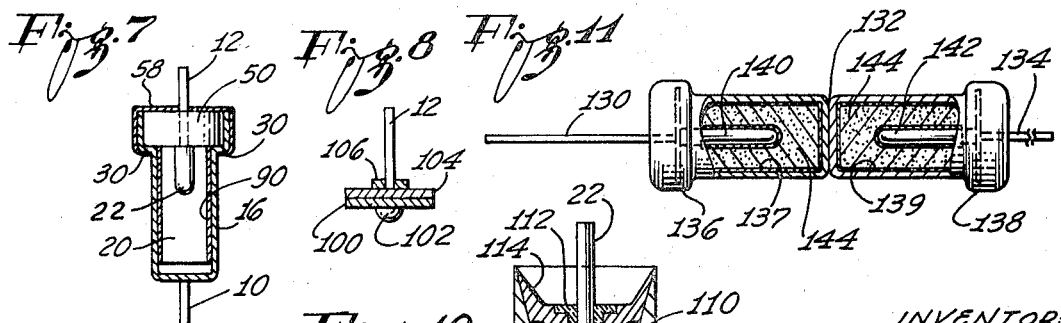
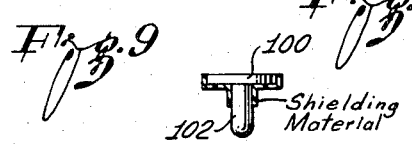
INVENTOR:
Martin Mintz
Attorneys

United States Patent Office 3,423,648
Patented Jan. 21, 1969

3,423,648
ELECTROLYTIC CELL WITH ELECTRICALLY CONDUCTIVE MASKING SURFACE
Martin Mintz, Woodland Hills, Calif., assignor to The Bissett-Berman Corporation, Santa Monica, Calif., a Corporation of California
Filed Jan. 10, 1966, Ser. No. 519,634
U.S. Cl. 317—231
Int. Cl. H01g 9/00, 9/04
25 Claims

ABSTRACT OF THE DISCLOSURE

An electrolytic cell comprises a sealed container filled with an electrolyte containing a platable mobile ionic component of a metal. The surface of one of the electrodes in contact with the electrolyte is composed of the same metal, as the ionic components, and is electrochemically active with the electrolyte for supplying the component. Another electrode surface has a chemically non-reactive masking layer, and the component in the operation of the cell is platable on and of the masking layer as desired.

---

This invention relates to electrolytic cells of the sort described in U.S. application Ser. No. 179,847, filed on Mar. 15, 1962, in the name of Thomas B. Bissett. More particularly, the principles set forth in the instant application relate to improvements in electrolytic cells to upgrade their performance as timing or integrating components in complex electronic circuits.

In general, an electrolytic cell is a container in which there is a liquid (the electrolyte) which carries current by the movement of ions dissolved in the liquid. Two or more electrodes immersed in the electrolyte provide for the passage of current in and out thereof. One of the electrodes is composed of an inert metal, such as platinum, tungsten, or tantalum, and another electrode is composed of an active metal, such as copper or silver. Molecules from the active metal electrode will be plated on the inert metal electrode upon the imposition of a voltage of the proper polarity across the electrodes.

According to the principles of the above-cited application, Ser. No. 179,847, such as an electrolytic cell has characteristics making it useful as a circuit component. For example, the cell has a relatively long discharge time constant, with a linear relation between the amount of active metal transferred and the time required for said transfer to occur upon the application of a constant voltage to the electrodes of the cell. An electrolytic cell is also a very sensitive "timer" because the voltage applied across the electrodes need not be very large. Thus the sensitivity and linearity of the cell make it useful for accurate timing and measurement. Moreover, since it can have a long discharge time, it is useful for performing long-term analog storage. For example, by controlling the amount of active metal on one of the electrodes and by closely regulating the amount of current going through the cell, a closely-defined time lapse related to the amount of metal transferred from the active electrode to the inactive electrode can be delineated.

Electrolytic cells functioning in this manner can perform many useful tasks in electrical circuits. For example, to have such an electrolytic cell perform integration, from which the amount of power or energy supplied by a circuit may be derived from the amount of current passing therethrough, the cell need only be placed at such a point in the circuit that the current flowing through the circuit must pass to the cell. Upon operation of the circuit, ions from the active electrode pass to the inert metal electrode and are plated therein at a rate proportional to the amount of current and the period of time during which the current flows. The cell, therefore, integrates with respect to time the current that flows in the circuit so as to serve as an energy indicator. Since the information is permanently stored within the cell until such time as the inert electrode is deplated of all its active metal, all such measurements of energy and other integrations can be reserved for later reference.

Such reserved information can be retrieved from the cell by passing current having a particular magnitude through the cell in an opposite direction to the original current. This causes the active metal to be "deplated" or in other words, redeposited on the active metal electrode from which it originally came. A simultaneous measurement is taken of the period of time for all the active metal to be deposited again on the original electrode. Since the particular current is known, the time required to deposit the active metal on the original electrode indicates the energy originally produced in the electrical circuit. Information representing energies as low as a fraction of a coulomb and with no upper limit can be accordingly retrieved.

Because of their high-accuracy, low power consumption, small size and low cost, electrolytic cell times are usable throughout a wide range of applications, including "one-shot" expandable service in satellites, sonobuoys, missiles, and the like. In order to keep the airways clear, transmission from such devices as satellites and sonobuoys must be ended as soon as the needed data has been transmitted. In such cases, there is no more economical method of disabling the transmitter than to insert an electrolytic cell in the transmitter circuitry in such position that its voltage jump upon the exhaustion of platable metal ions will cut off a critical stage of the transmitter. In like manner, firing of rocket and recovery stages, sonobuoy scuttling, fuse arming, and many other time delay problems that require squib firing or some mechanical movement can be inexpensively solved with a "one-shot" electrolytic cell timer. In such a case the entire timer assembly consists of a small battery, a current limiting resistor, a silcon controlled rectifier (SCR) and the electrolytic cell itself.

As stated in more detail in the above-cited application, Ser. No. 179,847, the electrolytic cell which is the subject of the instant invention can be used also to provide new and smaller portable radar receivers and radar detectors. They may also be used to replace the standard time-constant circuitry (which is often nonlinear in rise curve) to provide multivibrators of either the monostable or bistable variety. In the manner discussed above, the cell can be used for memory storage, and with high enough deplating currents can be made fairly fast in operation.

With all the above-described uses for electrolytic cell timers and with additional uses in prospect, it is the general object of the instant invention to improve and maximize the performance characteristics of electrolytic cell times. In particular, it is desired to prevent any current flow in the cell other than the flow directly attributed to input signals at the electrodes. The current flow problem arises, of course, in electrolytic cells as in ordinary batteries and storage cells, because of the tendency of the system to exchange ions back and forth until equilibrium and uniform distribution has been achieved.

Another improvement sought by the instant invention is the maximum sharpness of transition between the low plating voltage of the electrolytic cell and the high voltage which occurs as soon as it runs out of plating material. One principle of the instant invention is to sharpen this transition by so constructing the electrolytic cell that plating material is distributed such that all areas of the cell are deplated at the uniform rate and will be finally exhausted at the same instant.

Another important object in improving electrolytic cell performance is to prevent minute cell contamination during manufacture and to immunize the cell once manufactured to damaging changes due to wear, vibration, or temperature change.

Another object of the instant invention is to maximize the surface area and resulting flow in an electrolytic cell in order to make possible the almost-instant deplating necessary for useful information retrieval in most circuit applications.

Other desirable characteristics which are achieved by various principles of the instant invention include providing a strong and vibration-immune electrode configuration and easy manufacture ability of electrolytic cells, so that their "one-shot" potentialities will be widened due to their decrease in expense and their immunity to such shocks as missile take-offs, shell firings, and the like.

In the achievement of the above and other objects and as a principle of the instant invention there is provided an electrolytic cell wherein a silver container is used both as the outer housing of the cell to contain the electrolyte and also as one electrode of the cell. With such an arrangement the container-electrode can be connected as the anode and can provide an almost limitless reservoir of silver for electrochemical plating on a center inert electrode, which would be electrically connected as the cathode of the electrolytic cell. The advantage of this arrangement is that very long time delays, integrations, and other measurements can be performed by the cell. Moreover, the cell could handle higher current and voltages without becoming exhausted of plating material.

As another principle of the instant invention, if the container-electrode is made of a cylindrical design or the like surrounding an inert electrode of cylindrical design and axial placement relative to the container-electrode, the electrolytic cell will have a very uniform field of distribution, which will mean that the point of complete deplating will be reached at the same instant throughout the electrolytic cell system. As discussed above, this is a necessary condition to a sharp plating-voltage, nonplating-voltage transition period.

As another principle of the instant invention the inert electrode of the electrolytic cell is made of the same material (preferably silver) as the container-electrode, so that the ions that go in the solution will not alter the conditions of the electrolytic cell system. This principle makes it possible to use slightly corrosive electrolytes, while not suffering the penalty of corrosion damage to the cell. As an example of the potentialities of an electrolytic cell according to the above principles, the limitless amount of silver and the absence of corrosion error make it possible to use such a cell to integrate power consumption over the course of a long period of time such as an entire year with more than adequate accuracy and with information retrieval only at the end of the year period.

As another principle of the instant invention, a variety of etching procedures, to be described in detail below, have been developed for treating the surface of the container-electrode of electrolytic cells in such manner as to purposely corrode and roughen the surface thereof and make the surface layers of silver or other platable material more electroactive so that such an electrolytic cell enters into the plating and deplating process with less time delay and power loss than would a container of pure untreated silver.

As another feature of the instant invention, the inert electrode of an electrolytic cell is constructed by making it of the same metal as the active electrode, as discussed above, but is made chemically inert or non-reactive by plating it with gold or some other masking material. One important characteristic of the masking material should be that it be porous, so as to maximize the effective plating area of the inert electrode. The gold plating prevents ion exchange and stray currents in the electrolytic cell and provides a good porous surface for ions from the container-electrode to plate onto the electrode. Moreover, since gold plating on silver tends to "look" very much like silver to incoming silver ions, it has a better affinity for these ions and thus is a good collector for the outside plating layer from the container-electrode during the plating process.

Other principles which are featured in the instant invention relate to the details of configuration of both the container-electrode and the inert electrode of electrolytic cell timers and also relate to the precise configuration of the gold plating used on each of these elements. Further features are the precise principles of etching and electrolytic roughening whereby the plating material on the active electrode of an electrolytic cell timer can be made more efficient and responsive than has heretofore been the case.

Other objects and features of the instant invention and a better understanding thereof may be had by referring to the following description and claims taken in conjunction with the accompanying drawings in which:

FIGURE 1 is a side elevation in cutaway of a preferred embodiment of the electrolytic cell timer principles of the instant invention;

FIGURE 2 is a side elevation in cutaway of a second embodiment of the electrolytic cell principles of the instant invention;

FIGURE 3 is a side elevation in cutaway of a third embodiment of the electrolytic cell principles of the instant invention;

FIGURE 4 is a side elevation in cutaway of an electrolytic cell container which uses the bellows principle;

FIGURE 5 is a side elevation in cutaway of an electrolytic cell having electrodes at each end;

FIGURE 6 is a side elevation in cutaway of an electrolytic cell outer container before mounting of the electrode;

FIGURE 7 is a side elevation in cutaway of an electrolytic cell according to the principles of the instant invention;

FIGURE 8 is a side elevation of an electrolytic cell electrode according to the principles of the instant invention;

FIGURE 9 is a side elevation of a second electrolytic cell electrode according to the principles of the instant invention;

FIGURE 10 is a side elevation in cutaway of an electrolytic cell according to the principles of the instant invention; and FIGURE 11 shows a back-to-back configuration of an electrolytic cell.

Referring to FIGURE 1, a preferred embodiment of an electrolytic cell according to the principles of the instant invention has a first lead 10, a second lead 12, and a container or "can" 14 shown in the instant invention as composed of a silver inner lining 16 and an outer covering 18, which may be made of ceramic, glass, copper, steel, brass, Teflon, polyvinyl chloride, or any of a number of other suitable materials. The silver portion 16 of the can 14 is electrically connected to the lead 10. Inside the can 14 is sealed the electrolyte 20, which is preferably selected according to the principles set forth in the above-cited application, Ser. No. 179,847. As an example, a solution of a silver nitrate may be used.

Attached to the second lead 12 is an inner electrode 22 which according to the principles of the instant invention is made of the same material as the coating 16, preferably silver. The use of the same material on both electrodes minimizes ion migration in the electrolyte, since migration occurs in order that each substance can achieve random distribution. Where only one substance is present, random distribution is merely a matter of even migration of ions to all corners of the container, rather than constant deterioration of electrodes as ions migrate to the opposite electrode from that which they originated from. The inner electrode 22 has a rounded portion 24 extending into the can 14 and has a flanged end 26 by which it is held to the can 14. According to one principle of the instant invention a layer of gold 28 is coated between the silver body of the electrode 22 and the electrolyte 20, so that the electrode 22 can act as the inert electrode of the electrolytic cell of FIGURE 1. The layer of gold 28 constitutes an electrically conductive masking layer which is chemically inert or chemically non-reactive with the mobile ionic components, such as the silver ions, of the electrolyte 20.

The inner electrode 22 of the electrolytic cell is held to the can 14 in the following manner. The open end of the can 14 has a shoulder 30 formed therein and, prior to mounting the inner electrode 22, has a cylindrical wall 32 extending upward. In the course of mounting the inner electrode 22 a first washer or seal 34 is placed against the shoulder 30 in position to seal the electrolyte 20 in the can 14 once the electrode 22 is fully mounted. The flange 26 of the electrode 20 compresses the seal 34 against the shoulder 30 and the portion 24 of the electrode 22 extends through the seal 34 into the electrolyte 20. On the other side of the flange 26 is then placed a second washer or seal 36, and finally the wall 32 of the container 14 is crimped as at 38 to hold the entire assembly compressed together. One end 40 of the lead 12 extends through the crimp 38 and the seal 36 into the center of the electrode 22 to make contact with a silver portion thereof. In the electrolytic cell configuration of FIGURE 1, since the lead 12 is not integral with the inner electrode 22, it can be of a more suitable material for leads, such as nickel or copper, and can be strongly and permanently attached to the electrode 22 by filling the entire cup portion 24 thereof with solder as shown at 42 or by soldering the cup to the lead at a position near the flange 36. It will be appreciated that the lead 12 can also be attached to the cup by other techniques such as brazing.

In the preferred manufacture of the electrolytic cell of the instant invention, the gasket or seal 36 is made of a Kel-F elastomer silicon material which is flexible and will cold flow, so that it acts as a gasket and can distort under compression. At the same time, the inner washer 34 is made of Teflon, which is chemically inert and also compressible so that it will coldflow. Thus, under the influence of the permanently applied force in the crimping operation held by the portion 38 of the container 14, the washers 34 and 36 will compress, carrying the flange 26 between them. The result will be that a perfect seal will be achieved and escape of the electrolyte 20 will be prevented. Also, as heat and pressure changes inside and outside the electrolytic cell exert their influence, the washers 34 and 36 will absorb the changing forces within the cell, so that the performance of the system is minimally altered and the electrolytic cell is not ruptured or damaged in any way.

The manufacture of the inner electrode 22 is a simple and economical process whereby a flat plate is stamped or otherwise deformed into the cup shape shown at 24 with the flanges 26. Thereafter, the gold layer 28 is plated upon those areas of the electrode 22 which will be in contact with the electrolyte 20. The function of the gold layer 28 is to mask the silver of the electrode 22 from the silver 16 on the container 14 and from the electrolyte 20, so that only the silver 16 is available to form $Ag^+$ ions for plating in the electrolytic system 20. In the course of plating from the active electrode 14 to the inert electrode 22 silver from 16 is plated on top of the gold layer 28. Because the gold layer 28 is inert, the silver so plated will remain until such time as a deplating charge (the reverse of the plating charge) is applied across the electrodes 10, 12.

The operation of the electrolytic cell of FIGURE 1 is illustrated and described in detail in the above cited application, Ser. No. 179,847. However, whatever the function of the cell, it will be connected in appropriate electrical circuit using each lead 10, 12 as one terminal of the component. Since the silver 16 on the active electrode provides the $Ag^+$ ions which serve as the mobile ionic components in the electrolytic solution 20, the lead 10 should be of a positive potential relative to the lead 12 if plating is to be performed; for electrolytic cell plating consists essentially of the $Ag^+$ ions in solution gravitating to the inert electrode 22 where they become plated on the gold 28 to form a silver layer above the gold layer. Accordingly, the silver layer 16 must be made the anode of the electrolytic cell, while the inert electrode 22 is made of the cathode.

The removal of electrons from the silver layer 16 will of course produce $Ag^+$ ions in the electrolyte 20. These ions will eventually re-acquire their electrons when they electrochemically plate upon the gold layer 28. The above-described gravitation of silver ions from the anode 16 to the inert cathode gold layer 28 is denoted herein as the "plating operation" or as the "electroplating operation" or simply "plating." Once a certain amount of silver has been plated on the gold layer 28, the electrolytic cell can "deplate"; that is to say, serve as an anode to produce $Ag^+$ ions to return to the silver layer 16, which is then acting as a cathode.

The uses of the electrolytic cell of FIGURE 1 can vary from integration and timing to current measurement and information storage; but the basic performance will always be as described above. Because of the gold layer coating of the silver inert electrode 22, as taught by the instant invention, information stored in the process of plating the inert electrode 22 will not be caused to degenerate by random migration of $Ag^+$ ions after the removal of electrical signals from the leads 10 and 12. In the ordinary electrolytic cell of the prior art, because of the use of different metals on each electrode, migrations in the electrolyte 20 would occur to prevent any kind of meaningful information storage from being possible.

Another important feature of the electrolytic cell of FIGURE 1 is the configuration of container 14 and electrode 22 whereby the migration of $Ag^+$ ions in either direction is of fairly uniform rate throughout the cell. The importance of this is that when the information stored in the cell during the plating operation is sought to be regained by completely deplating all silver from on top of the gold layer 28 of the inner electrode 22 (and, of course, measuring the current required to do so), it is best to have all sectors of the silver or gold layer 28 become totally deplated at the same instant, so that the transition at the end of the deplating is as sharply define as possible. Since this transition will be sensed by detecting the shift in voltage from the low deplating voltage across the leads 10, 12 to the high voltage present when there are no longer any $Ag^+$ ions on the electrode 22 to sustain current flow, the sharper the transition between these voltages and the more accurate the information retrieval will be.

Regardless of what particular information sensing or storing application it is used for, the electrolytic cell of FIGURE 1 always functions by counting units of current flow from the lead 10 to the lead 12 by the medium of having the current cross the electrolyte 20 on $Ag^+$ ions. If it is desired to perform an integration of power or energy as discussed above, the electrolytic cell of FIGURE 1 would simply be connected in series between the power supply and the utilization device or else connected in some other way where it has a representative amount of current flowing through it. Thereafter, while the power is being supplied, the $Ag^+$ ions will go from 16 to 28. After the power supply operation has been completed and it is desired to learn how much power was supplied, some test device would be connected in circuit with the leads 10 and 12 to run a known amount of current in a direction opposite to that of the power supply current to completely deplate the silver plated on the gold layer 28. Once the silver plated on the gold layer 28 was completely deplated, the amount of current required to do so would be the same as the amount of current originally used for the plating operation.

The cell shown in FIGURE 1 also has other advantages of some importance. One advantage results from the fact that the cup 14 and the electrode 22 are concentric so that a uniform distribution of charge is produced. Furthermore, the electrode 22 is stocky and strongly supported. This tends to minimize vibration by reducing the amplitude of vibration and increasing the frequency of vibration. The cell is also advantageous since the seal is produced only at the end from which the lead 12 emerges, the other end being naturally sealed by the can 14. Even at the end from which the lead 12 emerges, the construction of the can 14 enhances the seal because of the operation of the flange 38.

Referring to FIGURE 2, the electrolytic cell shown therein has some features in common with FIGURE 1, but also incorporates some other principles of the instant invention which improve the performance, durability, and economy thereof. For example, the outer container is completely made of silver as shown at 16, so that there will be an almost limitless supply of silver for long integrations and measurement applications. Similarly, the inner electrode 22 is made as a silver column coated with gold at 28 and having the lead 12 attached by butt welding or the like at the flange 26. The decreased bulk of the solid column electrode 22 of FIGURE 2 provides a greater area within the electrolyte that is available for carrying $Ag^+$ ions for plating from the silver at 16 and also provides greater distance from the gold plating 28 to the silver outer container 16. This increased area causes the plating and deplating at 28 to be more uniform because of the greater space for distribution of the $Ag^+$ ions.

Another important advantage of the solid silver container 16 disclosed in FIGURE 2 is that it tends to minimize any thermal lag that may occur during rapid ambient temperature changes in various circuit environments and applications of the electrolytic cell. This is important in the use and operation of the electrolytic cell, because its electrical characteristics change with temperature. Thus improved performance of an electrolytic cell as disclosed herein can be obtained when these temperatures occur rapidly and stabilize quickly. In such case, the electrolytic cell can be combined in circuit with semiconductor elements which have temperature characteristics that follow or complement the cell temperature characteristics or in some other way provide temperature compensation.

The embodiment shown in FIGURE 2 also has other important advantages. It provides a solid and integral electrode to a position external to the cell, where a lead can be attached to the electrode 22 as by a butt weld. This tends to eliminate problems of contamination since the electrode 22 is a unitary silver member to the butt weld. Furthermore, since the electrode 22 is solid, it can be easily shaped to provide undulations along its surface so as to increase the area for the deposit or removal of silver.

One important teaching of the instant invention in regard to the manufacture of the outer containers of the electrolytic cells of FIGURES 1 and 2 is an etching method which has been developed for treating the surface of the silver can 16. By etching the inner surface of the silver can with acids or other materials and by electrolytically corroding this surface to get a roughened surface, the silver at 16 can be made more electroactive, so that it enters into plating and deplating action in the performance of the electrolytic cell far more readily and uniformly than would a pure drawn silver surface. This activation method involves mechanically etching the inside of the can or electrolytically corroding the inside of the can.

Applicants have discovered that if this activation etching is performed just before the unit of FIGURE 1 or FIGURE 2 is assembled, the results thereof will be most permanently sealed within the electrolytic cell of FIGURE 1 and 2 after it is finally crimped as shown at 38. The etching may be performed with nitric acid or the like, but using a stronger solution than is standard for ordinary cleaning of such surfaces. The etching may be performed at ambient temperature and has proceeded successfully using one normal solution applied for three minutes. Before etching the surface should be degreased using some substance such as trichloral ethylene.

The effect of the above-described process is to remove surface oxides and sulfides and to almost totally eliminate the outer layer of silver on the surface, where grain structure of the silver is deformed. After etching as taught by the instant invention, therefore, the silver 16 which will be in contact with the electrolyte 20 will be an unadulterated and undeformed layer of silver, but somewhat roughened to increase the contact area thereof with the electrolyte 20. Such an inner surface 16 has been found to vastly improve the precision and accuracy of electrolytic cells, as shown in FIGURES 1 and 2.

Referring to FIGURE 3, another electrolytic cell according to the principles of the instant invention has leads 10 and 12 embedded in the cap 50 which may be made of Teflon, ceramic, or the like. The ends 52 and 54 extending into the cup 14 through the cap 50 are the two electrodes of the electrolytic cell. These ends 52 and 54 may be made of gold wire, platinum wire, tungsten wire, tantalum wire, or the like. The electrolyte 20 would be as set forth above.

In the electrolytic cell of FIGURE 3, the container can 14 would be constructed of some inert material, such as ceramic or glass. The cell is then assembled by placing a seal 56 on the shoulder 30 of the container 14. The ceramic head 50 is then placed on the shoulder 30 and a cap 58 of metal or some other permeable material is crimped at 59 to the shoulder 30 of the container 14 to form a solid and permanently assembled electrolytic cell.

The electrolytic cell of FIGURE 3 has the important advantages that it is made of less expensive material and can have both its container 14 and its head 50 constructed of material that is electrically neutral and a good heat insulator. Moreover, the usual materials used in the container 14 and head 50 would be immune from errosion by an active electrolyte 20. Although the electrodes 52 and 54 would ordinarily be constructed of the materials specified above, the gold plating principle discussed in connection with the inert electrode 22 of the electrolytic cells of FIGURES 1 and 2 could also be practiced on one of the electrodes 52 or 54 of the electrolytic cell shown in FIGURE 3. Also, as an alternative construction, one of the electrodes 52 or 54 could be eliminated and a silver coating on the container 14 be connected to the lead formerly used for the electrode or a silver coating on the container 14 may be used with the electrodes 52 and 54 as separate electrodes.

Another type of container can according to the principles of the instant invention is shown in FIGURE 4. The container can 14 of FIGURE 4 may be of the solid silver type or of another metal coated with silver. Beneath the wall 32 thereof there is formed a bellows section 60 in the metal itself. The performance of the bellows section 60 is that after the electroyte 20 has been loaded into the container 14 and the seals and electrodes have been mounted ready for crimping, the crimping operation as shown in FIGURES 1 and 2 would have the added effect of compressing the bellows 60, so that the maximum amount of air possible would be expelled from the container can 14. This device for the elimination of air bubbles from the electrolyte 20 would have the great advantage in electrolytic cells of the sort discussed herein that it would prevent discontinuities in the electrolyte and would thus expose the maximum amount of electrode surface to contact with the electrolyte and would promote the maximum amount of uniformity of electrode surface in contact with the electrolyte 20. This maximum exposure and uniformity would of course heighten the performance of electrolytic cells using the container of FIGURE 4 in those applications where they are operating at high speed or at very high precision.

Another form of electrolytic cell in which the principles of the instant invention are embodied and which is in itself a specific feature of the instant invention is formed from metal or some other crimpable material which serves as the outer container 70. This outer container is crimped at both ends 72 and 74 to hold in the electrolyte 20 and two electrodes 76 and 77, which are electrically connected to the leads 10 and 12, respectively. The electrolytic cell of FIGURE 5 is sealed by two washers or the like 78 and 79, against which the crims 72 and 74 are made. The leads 10 and 12 pass through the washers 78 and 79 to reach the electrodes 76 and 77, respectively.

The electrolytic cell of FIGURE 5, although it does require two crimping operations instead of only the one as discussed in connection with the cells shown in the prior figures, does have the advantage of perfect uniformity of plating between the electrodes 76 and 77. This uniformity is, of course, ensured by the fact that the electrodes 76 and 77 are parallel and congruent plates.

If it is desired to approximate the configuration of the electrolytic cell of FIGURE 5 using inert material such as ceramic or glass, which would not be readily crimpable, a container can 14 of the sort shown in FIGURE 6 would serve equally well. It would comprise a main cylindrical wall 80 and shoulders 82 and 84 about which a metal cap of the sort shown at 58 could be crimped. Additionally, of course, a head 50 having one electrode passing therethrough and a seal 56, all as shown in FIGURE 3, could be used together with the container can of FIGURE 6.

Referring to FIGURE 7, another principle of the instant invention which may be practiced with any of the electrodes and container cans discussed in connection with the above six figures, involves the use of gold shielding to direct the flow of $Ag^+$ ions in such direction as to promote the uniformity of plating for the reasons discussed above. For example, the multiple electrode structure of FIGURE 3 may be used with a container as shown in FIGURE 7. In the electrolytic cell shown in FIGURE 7, the container is shown as being of solid silver, as set forth in the cell configuration discussed in connection with FIGURE 2. On the other hand, it has an electrode 22 embedded in a head 50 which is held to the shoulders 30 of the silver container 16 by a cap 58, as discussed in connection with FIGURE 3. The electrode 22 is shown of the solid type as discussed in connection with FIGURE 2 and would have the gold layer 28 as well. The electrical lead 10 is connected to the silver can 16, while the lead 12 is connected to the electrode 22 as discussed in connection with FIGURE 2.

The principle of the instant invention specifically illustrated in FIGURE 7 is the use of a gold layer 90 to electrochemically shield certain portions of the surface of the container 16. In FIGURE 7, the gold layer 90 is coated along the sides of the container 16 to prevent any silver from this area being available as $Ag^+$ ions to coat on the electrode 22 in the plating operation. Conversely, the deplating operation, the flow of $Ag^+$ ions would be downward to the unshielded surface of the container can 16.

Thus it can be seen that by appropriate shielding of the active electrode of an electrolytic cell (the inert electrode is already totally masked), the flow of plating ions can be directed through the electrolyte 20 along such paths as to ensure that the plating ions are evenly dispersed and will plate uniformly on the electrode toward which they are traveling. It should be emphasized at this point that although gold has been discussed as the principal plating element, mainly because it is a preferred element due to its similarity to silver, shielding could also be accomplished using platinum, rubidium, palladium, Teflon, or a number of other similar substances. However, with some of these elements, such as platinum, the current through the electrolytic cell would not be reversible.

Referring to FIGURE 8, an improved electrode according to the instant invention has a plate 100 of silver or gold and uses a silver slug 102 coldwelded or otherwise attached to the plate 100. The shape of the silver slug 102 would be such as to ensure a uniform $Ag^+$ ion distribution in the electrolyte 20 of any electrolytic cell wherein the electrode of FIGURE 8 was used. Mounted above the plate 100 is another plate 104 composed of brass, bronze, or some other durable substance. The lead 12 of the electrode of FIGURE 8 may be attached to the plate 104 by soldering, welding or some other suitable method, the result of which is represented at 106.

Referring to FIGURE 9, another principle of the instant invention which could be applied to the electrode of FIGURE 8 or to any other of the electrodes of the instant inveniton is that Teflon or other suitable shielding material may be sprayed in certain portions of the electrode 22 for purposes similar to the shielding of the container electrode 14: to properly condition the flow of ions to and from the electrode. Especially where the electrodes of FIGURES 8 or 9 are used as the anode in a double-ended electrolytic cell made from containers of the sort shown in FIGURES 5 and 6, the shielding principles of FIGURES 8 and 9 would be very useful.

FIGURE 10 sets forth an electrolytic cell designed to be assembled in an entirely different manner from the crimped cells discussed heretofore. The silver container can 16 has walls 110 at the top that converge inward to the full thickness of the can 16. The electrode 22 is electrically connected to the lead 12 at some point outside the can and is embedded in a ceramic insert 112. The ceramic insert 112 is itself embedded in a coldweld head which is shaped to interact with the sloping walls 110 of the can 16 in such manner that when the assembly comprising the electrode 22, ceramic insert 112, and the coldweld head 114 is forced down against the converging walls 110, a cold flowing connection between the walls 110 and the coldweld head 114 will be effected. This one coldwelding operation will thus replace both the assemblying of the double seals 34, 36 discussed above and the crimping 38 over the double seals thereafter.

Referring to FIGURE 11, the electrolytic cell unit shown therein is a three-electrode device having leads 130, 132, and 134. The lead 132 is electrically connected to two container cans 136 and 138 mounted back to back and directly connected electrically. In the initial condition of the three-electrode unit of FIGURE 11 all platable material is coated on the inner walls of the cans 136 and 138 (or is integral therewith), as shown at 137 and 139. The lead 130 is then attached to a first electrode 140 associated with the can 136, while the lead 134 is attached to a second electrode 142 associated with the can 138. Electrolyte 144 is sealed into the cans 136 and 138 as explained above in greater detail.

In the operation of the back-to-back unit of FIGURE 11, the application of a positive electrical signal between leads 130 and 132 or between leads 134 and 132 would cause the migration of plating ions from 137 or 139 to 140 or 142, respectively. Thus a timing operation or an integration of electrical current can be performed in either cell, 136–140 or 138–142. Thereafter, the readout may be performed by passing a deplating current through that cell between leads 130 and 134, with lead 132 out of circuit. Since the same current that reads out the integral in the previously plated cell by deplating said cell also plates the previously unplated cell, the integral from the former is transferred to the latter in the course of being read out. Thus the unit of FIGURE 11 provides non-destructive readout capability.

From the above discussion it can be seen that applicant has provided an improved electrolytic cell which in configuration and other features is best adapted to perform the functions of timing, integration and information storage. The prior characteristics of electrolytic cells—that they would degenerate with time whenever there was a charge across their plates due to the migration of ions back and forth to achieve even distribution—has been cured by the expedient of making both electrodes of the electrolytic cell of the instant invention of the same ions supplying material. Thereafter, one of these electrodes is made into the inert electrode by masking, preferably with a material that looks to the ions and the electrolyte as though it were one of their own types of material.

Another accomplishment of the instant invention is the achievement of maximum sharpness between plating voltage and non-plating voltage, by promoting the uniformity and thus simultaneous completion of plating and deplating flow from one electrode to another. Similarly, the invention sets forth principles for maximizing the responsiveness and ease of plating in electrolytic cells by the new principles of etching or other treatment of the surface of the electrodes that is to be in contact with the electrolyte.

Although the invention has been described in its preferred form with a certain degree of particularity, it should be understood that the present disclosure of the preferred form has been made only by way of example and that numerous changes in the details of construction and in the combination and arrangements of parts may be resorted to without departing from the spirit and scope of the invention as hereinafter claimed.

I claim as my invention:

1. An electrolytic cell in combination, comprising:
    a container-electrode with an opening and having a metal inner surface,
    an electrolyte in said container-electrode containing in the electrolyte a mobile ionic component of the metal forming said surface,
    an electrode disposed within said container-electrode, spaced from the walls thereof, and having an electrically conductive masking layer on its surface in contact and chemically non-reactive with said electrolyte, said mobile ionic component being selectively electroplatable on and deplatable from said masking layer, and
    electrically insulative means sealing the opening of the container-electrode and supporting said second electrode projecting therefrom into the container-electrode.

2. The electrolytic cell set forth in claim 1 wherein a third electrode is disposed within said container-electrode, spaced from the walls thereof and from the second electrode, and having an electrically conductive masking layer on its surface in contact and chemically inert to said electrolyte, said mobile ionic component being selectively electroplatable on and deplatable from said masking layer of said third electrode.

3. The electrolytic cell set forth in claim 1 wherein portions of the container-electrode in contact with the electrolyte are compressible.

4. The electrolytic cell set forth in claim 1 wherein a portion of the inner surface of the container-electrode comprises a shielding layer for preventing any transfer of the mobile ionic components of the metal from said portion of the inner surface.

5. The electrolytic cell set forth in claim 1 wherein at least a portion of the surface of the electrically conductive masking layer comprises a layer of said metal thereon.

6. An electrolytic cell in combination, comprising:
    a container-electrode with an opening and having an inner surface,
    an electrolyte in said container-electrode,
    an electrode disposed within said container-electrode and having an outer surface spaced from said inner surface,
    masking means electrically conductive and chemically non-reactive to said electrolyte covering one of said surfaces and the other of said surfaces being a chemically non-reactive metal,
    the electrolyte containing a mobile ionic component of said metal, said mobile ionic component being selectively electroplatable on and deplatable from said masking means, and
    electrically insulative means sealing the opening of the container-electrode and supporting said electrode projecting therefrom into the container-electrode.

7. The electrolytic cell set forth in claim 6, including:
    a second electrode disposed within said container-electrode and having a surface contacting said electrolyte and spaced from said inner surface, said inner surface or the surface of said second electrode being electrically conductive and chemically non-reactive to said electrolyte and the other thereof being a chemically non-reactive metal.

8. The electrolytic cell set forth in claim 6, including:
    a shielding layer on at least a portion of the inner surface of the container-electrode for preventing a mobile ionic component of the metal thereof from being transferred from said portion to the electrolyte or from the electrolyte to said portion.

9. The electrolytic cell set forth in claim 6, further comprising:
    a second container-electrode with an opening and having a second inner surface,
    an electrolyte in said second container-electrode,
    a second electrode disposed within said second container-electrode and having a second outer surface spaced from said second inner surface,
    masking means electrically conductive and chemically non-reactive to said electrolyte in the second container-electrode, said masking means covering one of said second surfaces and the other of said second surfaces being a chemically non-reactive metal,
    the electrolyte in the second container-electrode containing a mobile ionic component of said metal, said mobile ionic component being selectively electroplatable on and deplatable from said masking means on one of said second surfaces,
    the second container-electrode and the first container-electrode having a common electrical connection, and
    electrically insulative means sealing the opening of the second container-electrode and supporting the second electrode projecting therefrom into the second container-electrode.

10. The electrolytic cell set forth in claim 6 wherein a layer of said metal is disposed on said masking means on one of said surfaces.

11. In combination in an electrolytic cell having properties of serving as a coulometer:
    a container-electrode having an open end and having an inner surface,
    an electrode mounted in the open end of the container-electrode and extending into the container-electrode and having an outer surface spaced from said inner surface,
    electrolytic means disposed within said container-electrode and contacting said outer surface of the electrode,
    first electrically conductive masking means forming a first one of said inner and outer surfaces for preventing the transfer electrochemically of ionic components from said first one of said surfaces to said electrolytic means,
    second electrically conductive means forming the other one of said inner and outer surfaces for providing transfer of mobile ionic components of said electrically conductive means electrochemically from said other surface to said electrolytic means, said mobile ionic components being platable on and deplatable from the surface of said masking means, and means for holding said electrode in the open end of the container-electrode in electrically insulated and sealed relationship with the container-electrode.

12. The combination set forth in claim 11 further comprising a second electrode sealingly mounted in the open end of the container-electrode and extending into the container-electrode in spaced relationship to the first electrode for defining a second outer surface spaced from said inner surface, said second electrode outer surface having solely either an electrically conductive masking means corresponding to the first electrode outer surface or an electrically conductive surface corresponding to the first electrode outer surface.

13. The combination set forth in claim 11, including:
a second container-electrode having an open end and a second inner surface,
a second electrode mounted in the open end of the second container-electrode and extending into the second container-electrode and having a second outer surface spaced from said second inner surface,
second electrolytic means disposed within said second container-electrode and contacting the outer surface of the second electrode,
third electrically conductive masking means forming a first one of said second inner and outer surfaces for preventing transfer electrochemically of ionic components from said first one of said second surfaces to said second electrolytic means,
fourth electrically conductive means forming the other one of said second inner and outer surfaces for providing transfer of mobile ionic components of said fourth electrically conductive means electrochemically from said other one of the second inner and outer surfaces to the second electrolytic means, said mobile ionic components of said fourth electrically conductive means being platable and deplatable from the surface of said masking means,
the second container-electrode having a common connection with the first container-electrode, and
means for holding said second electrode in the open end of the second container-electrode in electrically insulated and sealed relationship with the second container-electrode.

14. The combination set forth in claim 11, including:
means for shielding at least a portion of the container-electrode for preventing transfer of the mobile ionic components from said portion to said electrolytic means.

15. The combination set forth in claim 11, including:
a layer of the second electrically conductive means on the first one of said inner and outer surfaces.

16. The combination set forth in claim 11 further comprising the inner surface of the container-electrode being substantially free of surface impurities.

17. In combination in an electrolytic cell having properties of serving as a coulometer:
a can having an inner surface and being closed at a first end and being open at a second end opposite to the first end, said can having a major axis extending between the first and second ends and having a substantially symmetrical configuration relative to the major axis,
an electrode extending into the can through the open end and having an outer surface spaced therefrom within the can, the electrode being disposed substantially on the major axis of the can,
means for sealing the open end of the can and retaining the electrode in electrically insulated relationship with the can,
electrolytic means, containing mobile ionic components of a first one of said inner and outer surfaces, disposed within the can and in contact with the inner surface of the can and the outer surface of the electrode for providing electrochemical transfer of the mobile ionic components between said inner and outer surfaces,
a first one of the inner and outer surfaces having first electrically conductive means disposed in contacting relationship with the electrolytic means for providing an electrochemical transfer of said mobile ionic components of said first electrically conductive means to said electrolytic means and to the other one of the inner and outer surfaces and the other one of the inner and outer surfaces having second electrically conductive masking means for preventing electrochemical transfer of mobile ionic components of the second electrically conductive means to said electrolytic means and to the first one of the inner and outer surfaces.

18. The combination set forth in claim 17, including:
a second can having a second inner surface and being closed at a first end and being open at a second end opposite to the first end of the can, said second can having a major axis extending between the first and second ends and having a substantially symmetrical configuration relative to the major axis,
a second electrode extending into the second can through the open end and having a second outer surface spaced therefrom within the second can, the second electrode being disposed substantially on the major axis of the second can,
means for sealing the open end of the second can and retaining the second electrode in electrically insulated relationship with the second can,
the second can having a common electrical connection with the first can,
electrolytic means, containing mobile ionic components of a first one of the second inner and outer surfaces, disposed within the second can and in contact with the inner surface of the second can and the outer surface of the second electrode for providing electrochemical transfer of the mobile ionic components between said second inner and outer surfaces,
a first one of the second inner and outer surfaces having the first electrically conductive means disposed in contacting relationship with the electrolytic means for providing an electrochemical transfer of said mobile ionic components of said first electrically conductive means to said electrolytic means and to the other one of the second inner and outer surfaces and the other one of the second inner and outer surfaces having the second electrically conductive masking means for preventing electrochemical transfer of mobile ionic components of the second electrically conductive means to said electrolytic means and the first one of the second inner and outer surfaces.

19. The combination set forth in claim 17, including:
means for shielding a portion of the inner surface of the can for preventing transfer of the mobile ionic components from this shielded portion to said electrolytic means.

20. The electrolytic cell set forth in claim 17, comprising:
a third electrode electrically insulated from the two electrodes and in contact with the electrolytic means, the third electrode having the first electrically conductive means if the electrode constituting the sealed can has the second electrically conductive masking means and the third electrode having the second electrically conductive masking means if the electrode constituting the sealed can has the first electrically conductive means.

21. An electrolytic cell in combination, comprising:
an electrolyte containing an ionic component of a metal, two electrodes electrically insulated from each other and in contact with the electrolyte, one of said electrodes having a surface of the metal, the metal being electrochemically active with said electrolyte, the other of said electrodes having an electrically conductive masking surface in contact and chemically non-reactive with said electrolyte, and said ionic component being selectively electroplatable on and deplatable from said masking surface, one of said electrodes being a container with an opening and holding said electrolyte, and electrically insulative means sealing the opening of the one of said electrodes constituting the container and supporting said other electrode projecting therefrom into said electrode constituting the container.

22. The electrolytic cell set forth in claim 21, comprising:

two additional electrodes electrically insulated from each other and in contact with the electrolyte, one of said two additional electrodes having a surface of the metal, the other of said two additional electrodes having an electrically conductive masking surface in contact and chemically non-reactive with said electrolyte, and said ionic component being selectively electroplatable on and deplatable from said masking surface of the other of the two additional electrodes, one of the two additional electrodes being a sealed container with an opening and holding the electrolyte, the two electrodes constituting the sealed containers having a common electrical connection, and electrically insulative means sealing the opening of the one of said two additional electrodes constituting the container and supporting said other one of said two additional electrodes projecting therefrom into said electrode constituting the container.

23. The electrolytic cell set forth in claim 21, comprising:

a layer of said metal on the electrically conductive masking surface of said other electrode.

24. The electrolytic cell set forth in claim 21 comprising the surface of the metal being etched to provide a more effective area in contact with the electrolyte.

25. The electrolytic cell set forth in claim 21 comprising the surface of the metal being substantially free of grain deformities.

References Cited

UNITED STATES PATENTS

| | | | |
|---|---|---|---|
| 3,119,754 | 1/1964 | Blumenfeld et al. | 324—68 |
| 3,125,673 | 3/1964 | Puterbaugh | 235—92 |
| 3,172,083 | 3/1965 | Constantine | 340—173 |
| 858,574 | 7/1907 | Churcher | 317—233 |
| 2,154,026 | 4/1939 | Brennan | 317—230 |
| 2,736,846 | 2/1956 | Gables | 317—230 |
| 2,739,275 | 3/1956 | Hautz et al. | 317—230 |
| 2,791,473 | 5/1957 | Mattox | 317—231 |
| 3,017,612 | 1/1962 | Singer | 317—231 |
| 3,158,798 | 11/1964 | Sauder | 317—231 |
| 3,210,662 | 10/1965 | Steinmetz et al. | 324—94 |
| 3,346,783 | 10/1967 | Millard | 317—230 |

FOREIGN PATENTS 1,921,265  8/1965  Germany.

OTHER REFERENCES

Electronics: Nov. 16, 1964, pp. 67 to 71; an article entitled: Simple Cell Competes with Complex Components, by Herbert Feitler.

JAMES D. KALLAM, *Primary Examiner.*

U.S. Cl. X.R.

324—94; 340—373